US007021300B2

(12) United States Patent
Maki et al.

(10) Patent No.: US 7,021,300 B2
(45) Date of Patent: Apr. 4, 2006

(54) DIAGNOSTIC APPARATUS FOR AN EXHAUST GAS SENSOR

(75) Inventors: Hidetaka Maki, Saitama (JP); Hiroshi Kitagawa, Saitama (JP); Masaki Tsuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/925,150

(22) Filed: Aug. 25, 2004

(65) Prior Publication Data

US 2005/0061067 A1 Mar. 24, 2005

(30) Foreign Application Priority Data

Sep. 11, 2003 (JP) ............................ 2003-319792

(51) Int. Cl.
*F02D 41/22* (2006.01)
*F02D 41/14* (2006.01)
*G01M 15/00* (2006.01)

(52) U.S. Cl. ...................... 123/688; 73/118.1; 204/401

(58) Field of Classification Search ................ 123/688, 123/690; 701/109, 114; 73/23.32, 118.1; 204/401; 60/274, 276, 277, 285
See application file for complete search history.

(56) References Cited

U.S. PATENT DOCUMENTS

| | | | | |
|---|---|---|---|---|
| 5,325,711 | A | 7/1994 | Hamburg et al. | 73/118.1 |
| 5,682,868 | A | 11/1997 | Moraal | |
| 5,819,195 | A * | 10/1998 | Iwata | 123/688 |
| 6,287,453 | B1 | 9/2001 | Rösel et al. | |
| 6,481,273 | B1 * | 11/2002 | Maloney | 73/118.1 |
| 6,961,653 | B1 * | 11/2005 | Maki | 701/109 |
| 2005/0005690 | A1 * | 1/2005 | Maki | 73/118.1 |

FOREIGN PATENT DOCUMENTS

| | | | |
|---|---|---|---|
| DE | 198 44 994 | A1 | 4/2000 |
| DE | 102 23 554 | C1 | 8/2003 |
| EP | 1 006 353 | A2 | 6/2000 |
| JP | 07-145751 | | 6/1995 |

* cited by examiner

*Primary Examiner*—Tony M. Argenbright
(74) *Attorney, Agent, or Firm*—Arent Fox PLLC

(57) ABSTRACT

A deterioration failure diagnostic apparatus is provided for diagnosing an exhaust gas sensor disposed in an exhaust passage of an engine. The apparatus has a unit for generating a detecting signal and multiplying the generated signal to a first basic fuel injection amount to produce a second fuel injection amount. The apparatus includes a unit for calculating a feedback representative value based on feedback correction coefficients and multiplying the feedback representative value to the second fuel injection amount to produce a final fuel injection amount to be input to the engine. The apparatus includes a unit for extracting a frequency response corresponding to the detecting signal from an output of the exhaust gas sensor of the engine, the output being responsive to the calculated final fuel injection amount. A condition of the exhaust gas sensor is determined based on the extracted frequency response.

11 Claims, 10 Drawing Sheets

FREQUENCY(FID)OF DETECTION-USE SIGNAL (A)NORMAL (B)ABNORMAL

EXTRACTION OF FREQUENCY (FID) OF DETECTION-USE SIGNAL (a)NORMAL (b)ABNORMAL

CALCULATION OF LAF SENSOR RESPONSIVENESS PARAMETER LAF_DLYP

CALCULATION OF LAF SENSOR RESPONSIVENESS PARAMETER LAF_AVE(SMOOTHED VALUE OF KACT_FA)

DIAGNOSTIC APPARATUS FOR AN EXHAUST GAS SENSOR

BACKGROUND OF THE INVENTION

The present invention relates to a diagnostic apparatus for detecting a degradation failure of an exhaust gas sensor disposed in an exhaust passage of an internal-combustion engine (hereinafter referred to as an "engine").

An exhaust gas sensor is generally disposed in an exhaust passage of an engine of a vehicle in order to measure constituent elements of an exhaust gas. The exhaust gas sensor produces outputs representing air-fuel ratio of the exhaust gas. Based on the output value, an electronic control unit of the engine controls the air-fuel ratio of the fuel to be supplied to the engine. Therefore, when the exhaust gas sensor does not produce outputs reflecting a correct air-fuel ratio due to its degradation failure, the control unit cannot perform a correct control of the air-fuel ratio upon the engine.

There are disclosed some techniques for detecting a degradation failure of such exhaust gas sensor. The Japanese Patent Application Unexamined Publication (Kokai) No. HEI7-145751 and the U.S. Pat. No. 5,325,711 disclose a technique for generating a fuel signal by modulating a rectangular waveform, and processing the output of an oxygen sensor representing exhaust gas for determining an operating condition of the oxygen sensor.

However, in the above-referenced technique, a fuel amount indicated by a modulated rectangular waveform is injected into the engine and a response from the engine is used. A response, which is output responsive to the modulated rectangular waveform containing various frequency components, tends to be influenced by noises. Because such response signals are influenced by operating conditions of the engine, air-fuel ratio variation that may be produced during a transient operation, the frequency of the output signal for evaluating the sensor condition can hardly be kept at a constant level. Therefore, when the sensor condition is evaluated based on such output, evaluation precision may deteriorate. On the other hand, precision of the air-fuel ratio control is getting more important than before as emission control is enhanced and the amount of precious metals carried by the catalyst need to be reduced. Accordingly, in order to suppress an increase of the exhaust gas constituent elements due to the characteristic degradation failure of the exhaust gas sensor, it is required to improve the detection precision more than before and it is also required to suppress the increase of the exhaust gas constituent elements during the degradation detection process.

Thus, it is an objective of the present invention to provide a failure diagnostic apparatus for an exhaust gas sensor, which enables a further improvement of detection precision upon a deterioration failure of the exhaust sensor as well as a minimization of an increase of exhaust gas constituent elements during a degradation detection process.

SUMMARY OF THE INVENTION

The present invention provides a deterioration failure diagnostic apparatus for an exhaust gas sensor that is disposed in an exhaust passage of an engine to generate an output corresponding to constituent elements of exhaust gas from the engine. The apparatus has detecting signal generating means for generating a detecting signal and multiplying the generated signal to a first basic fuel injection amount to produce a second fuel injection amount. The apparatus also includes a feedback representative value calculating means for calculating a feedback representative value based on feedback correction coefficients used at a normal operation time and multiplying it to the second fuel injection amount to produce a final fuel injection amount to be input to the engine. The apparatus further includes an exhaust gas sensor evaluating means for extracting from the output of the exhaust gas sensor a frequency response corresponding to the detecting signal. The output of the gas sensor is in response to the calculated final fuel injection amount. The condition of the exhaust gas sensor is determined based on the extracted frequency response. The feedback representative value is a value representing a steady-state deviation of the feedback correction coefficients. According to this invention, instead of using the composite signal corresponding to the modulated rectangular waveform and the exhaust gas level, the fuel amount multiplied by the detecting signal of a predetermined frequency is supplied, so that the ratio of the detecting frequency components contained in the exhaust gas can be kept at a higher level. Besides, in such situation, the condition of the exhaust gas sensor can be diagnosed based on the frequency response in the above-described frequency of the exhaust gas sensor output. Thus, the ratio of the noise elements contained in the exhaust gas can readily be decreased and the detection precision of the deterioration failure of the exhaust gas sensor may be improved. At the same time, by using the feedback representative value to correct the fuel injection amount during the deterioration failure detection process, increase of the exhaust gas elements during the detection process may be suppressed in comparison to the case of simply suspending the feedback.

According to one aspect of the present invention, the feedback representative value is a value representing a steady-state deviation of the feedback correction coefficients used before the start of a process for detecting the degradation failure of the exhaust gas sensor. Specifically, the feedback representative value is an average, a median or a smoothed value of the feedback correction coefficients. According to this aspect of the invention, since the feedback representative value is calculated based on the average or the like of the feedback correction coefficients used before the start of the degradation failure detection process, the fuel injection amount can be corrected by the feedback representative value that is adapted to the characteristic of the engine and accordingly the increase of the exhaust gas elements during the detection process can be suppressed.

According to another aspect of the invention, the detecting signal to be multiplied to the first basic fuel injection amount is a signal obtained by adding either a sine wave or a cosine wave or a trigonometric wave to a predetermined offset value. According to this aspect of the invention, signals that are easy to produce are used. While the ratio of the frequency components for the detection is maintained substantial and the magnitude of the detecting frequency components in the exhaust gas is maintained substantial, the response of specific frequencies of the exhaust gas sensor is used for the evaluation purpose so that the detection precision of the deterioration failure of the exhaust gas sensor may be further improved.

According to a further aspect of the invention, the detecting signal to be multiplied to the first basic fuel injection amount is a signal obtained by adding a composite wave comprising two or more trigonometric function waves to a predetermined offset value. According to this aspect of the invention, in operating ranges where detection is hard to carry out, a composite wave comprising two or more trigonometric function waves of different frequencies may be employed such that two or more frequency responses may be used for determining the condition of the exhaust gas sensor. The trigonometric function wave can be formed to a desired waveform, which is reflected in the fuel injection amount so that the condition of the exhaust gas sensor can be determined. Accordingly, the detection precision of the deterioration failure of the exhaust gas sensor is enhanced.

According to yet further aspect of the invention, the exhaust gas sensor evaluating means determines the condition of the exhaust gas sensor when a predetermined time has elapsed since the fuel injection amount multiplied by the detecting signal was supplied to the engine. According to this aspect of the invention, the determination of the exhaust gas sensor condition can be performed stably by avoiding such unstable state of the exhaust gas air-fuel ratio that may appear at the time immediately after the detecting signal is reflected on the fuel. Accordingly, the detection precision of the deterioration failure of the exhaust gas sensor can be further enhanced.

According to yet further aspect of the invention, the exhaust gas sensor evaluating means determines the condition of the exhaust gas sensor by using an output from the exhaust gas sensor after it has gone through a band-pass filter. According to this aspect of the invention, the frequency components, which are contained in the exhaust gas, except for the detecting frequency, are removed because those frequencies are noises when the condition of the exhaust gas sensor is determined. Accordingly, the detection precision of the deterioration failure of the exhaust gas sensor may be enhanced.

According to yet further aspect of the invention, the exhaust gas sensor evaluating means determines that the exhaust gas sensor is a failure when an integral value obtained by integrating absolute values of the bandpass-filtered outputs from the exhaust gas sensor is less than a predetermined value. According to yet another aspect of the invention, the exhaust gas sensor evaluating means determines that the exhaust gas sensor is a failure when a value obtained by smoothing absolute values of the bandpass-filtered outputs from the exhaust gas sensor is less than a predetermined value. Since the variation in the outputs from the exhaust gas sensor can be thus averaged according to these aspects of the invention, the detection precision of the deterioration failure of the exhaust gas sensor may be further enhanced.

According to yet further aspect of the invention, the feedback coefficient is determined based on an output of either an exhaust gas sensor disposed upstream of a catalytic converter or an exhaust gas sensor disposed downstream of the catalytic converter. Outputs from the two exhaust gas sensors disposed upstream and downstream of the catalytic converter respectively may be used to determine the feedback coefficient. According to this aspect of the invention, a drift toward rich or lean which may be caused by correcting the fuel injection amount by applying the detecting signal to the fuel injection amount may be suppressed. As a result, it is possible to prevent the decrease of the catalyst purification rate that may take place with the use of the detection technique, thereby maintaining the detection precision while preventing increase of emission of undesirable constituents contained in the exhaust gas.

DESCRIPTION OF THE PREFERRED EMBODIMENTS

1. Description of Functional Blocks

Figure 1:
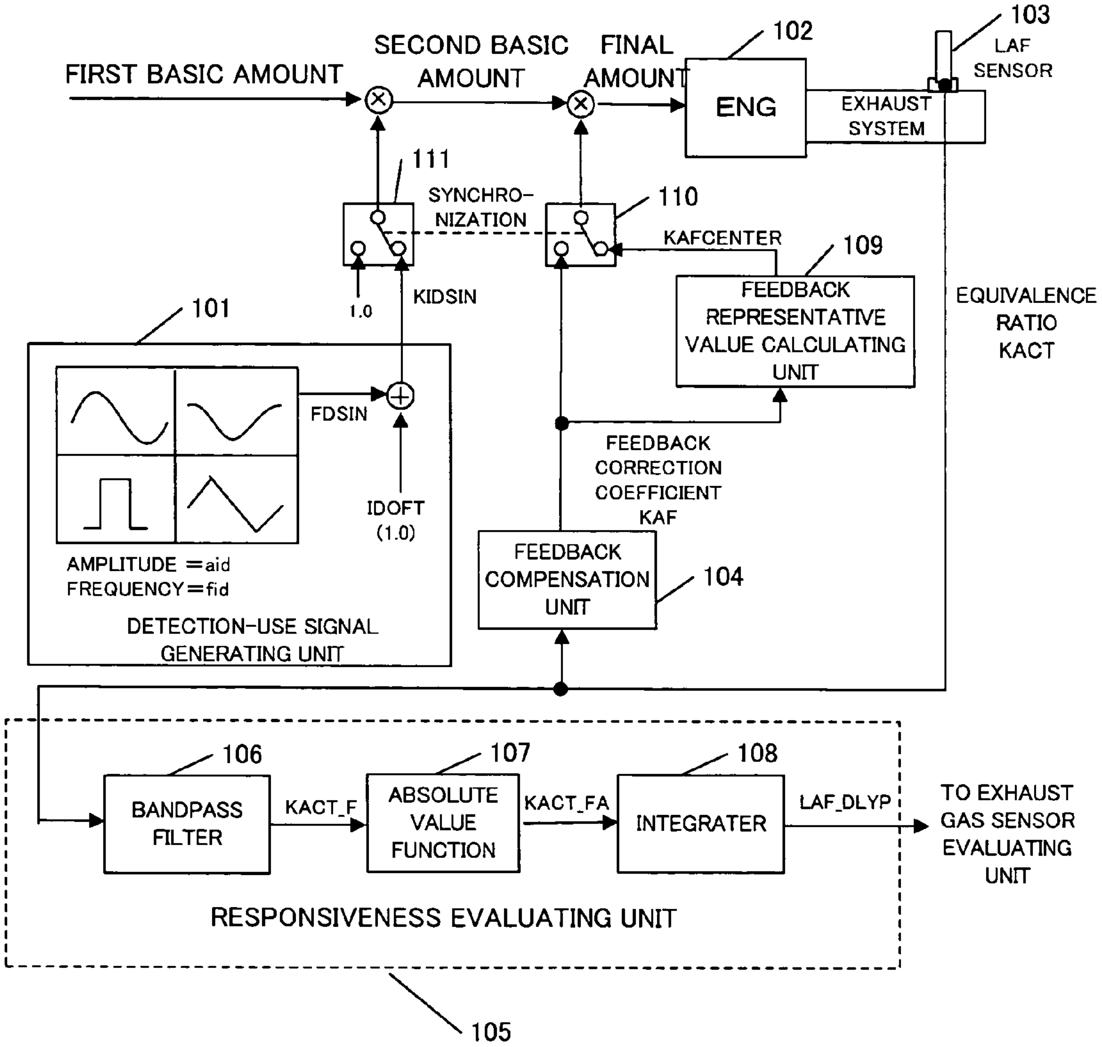
FIG. 1 is a schematic diagram showing an exhaust gas sensor failure diagnostic apparatus according to one embodiment of the present invention.

Each functional block will be described with reference to FIG. 1 and FIG. 2. FIG. 1 is a schematic diagram of an overall structure for describing a concept of the present invention.

A detecting-signal generating unit 10 has a function of generating a predetermined detecting signal KIDSIN in which a trigonometric function wave FDSIN or the like is superimposed on an offset value IDOFT. A responsiveness evaluating unit 105 has a function of performing a bandpass filtering upon an equivalence ratio KACT, which is an output from a wide-range linear air-fuel ratio sensor (hereinafter referred to as an LAF sensor) 103, then converting the filtered value to an absolute value, further integrating the converted values over a predetermined time period and finally transmitting this integral value to an exhaust gas sensor evaluating unit. The exhaust gas sensor evaluating unit has a function of determining a degradation failure of an exhaust gas sensor based on the transmitted values.

A feedback compensation unit 104 has a function of generating a feedback correction coefficient KAF to be used for keeping the air-fuel ratio at an appropriate level based on the output value from the LAF sensor 103. This calculation operation of the feedback compensation unit is suspended during a process for detecting a deterioration failure of the exhaust gas sensor.

A feedback representative value calculating unit 109 uses the feedback correction coefficients KAF calculated by the feedback compensation unit 104 to calculate a feedback representative value KAFCENTER that is a representative value of those coefficients. Specifically, KAFCENTER may be either an average, a median or a smoothed value of the feedback correction coefficients KAF, so it is a value representing mainly the steady-state deviation of the feedback correction coefficients. The feedback compensation unit 104 suspends its calculation of the feedback correction coefficient during the degradation failure detection of the exhaust gas sensor. Instead of the feedback correction coefficient, this feedback representative value is used as a coefficient to be multiplied to the second basic fuel injection amount containing the detecting signal so as to generate a final fuel injection amount. Similarly to the feedback compensation unit 104, the feedback representative value calculating unit 109 continues its operation for calculating the feedback representative value during the normal operation, but it suspends the calculation of the feedback representative value during the degradation failure detection process and holds the feedback representative value generated just before the suspension of the calculation.

The above-described functions of the exhaust gas sensor evaluating unit, the detecting signal generating unit 101, the feedback compensation unit 104, the responsiveness evaluating unit 105 and the feedback representative value calculating unit 109 can be implemented in an electronic control unit (ECU), so the operation of each unit will be described in detail later in association with the description of the ECU and the degradation failure diagnostic process for the exhaust gas sensor.

Engine 102 is an internal-combustion engine in which a final fuel injection amount can be controlled by an injection controller based on a value from a fuel amount calculating unit 206 (which will be described later).

The LAF sensor 103 is a sensor that detects an air-fuel ratio extending over a wide range from rich to lean of the exhaust gas discharged from the engine 102. The output of the LAF sensor 103 is used to generate an equivalence ratio KACT.

According to the present invention, the detecting signal KIDSIN is multiplied to the first basic fuel injection amount during the degradation detection process whereas a value of 1.0 is multiplied except during the degradation detection process. Besides, the feedback correction coefficient KF is used except during the degradation detection process whereas the feedback representative value KACENTER that is held in the representative unit 109 is used during the degradation detection process. Such switching operation is represented by switches 110, 111 in FIG. 1 and both switches operate simultaneously in synchronization with each other.

Figure 2:
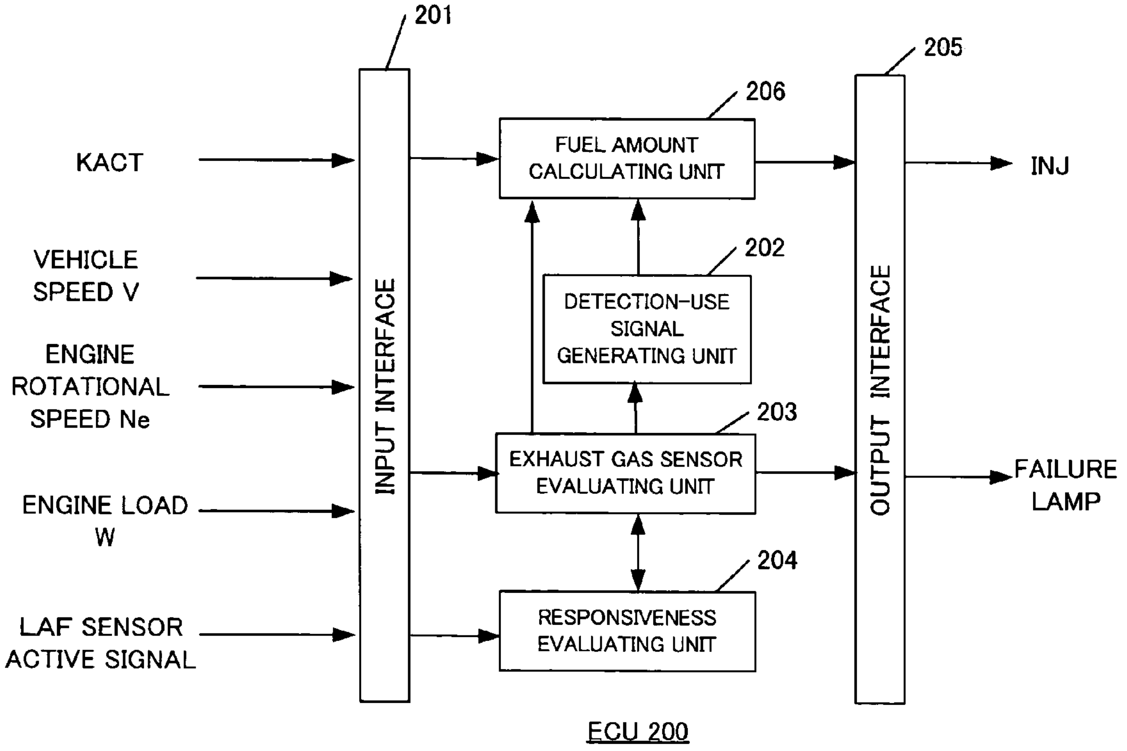
FIG. 2 shows an example of an ECU to be used in an exhaust gas sensor failure diagnostic apparatus according to one embodiment of the present invention.
Figure 3:
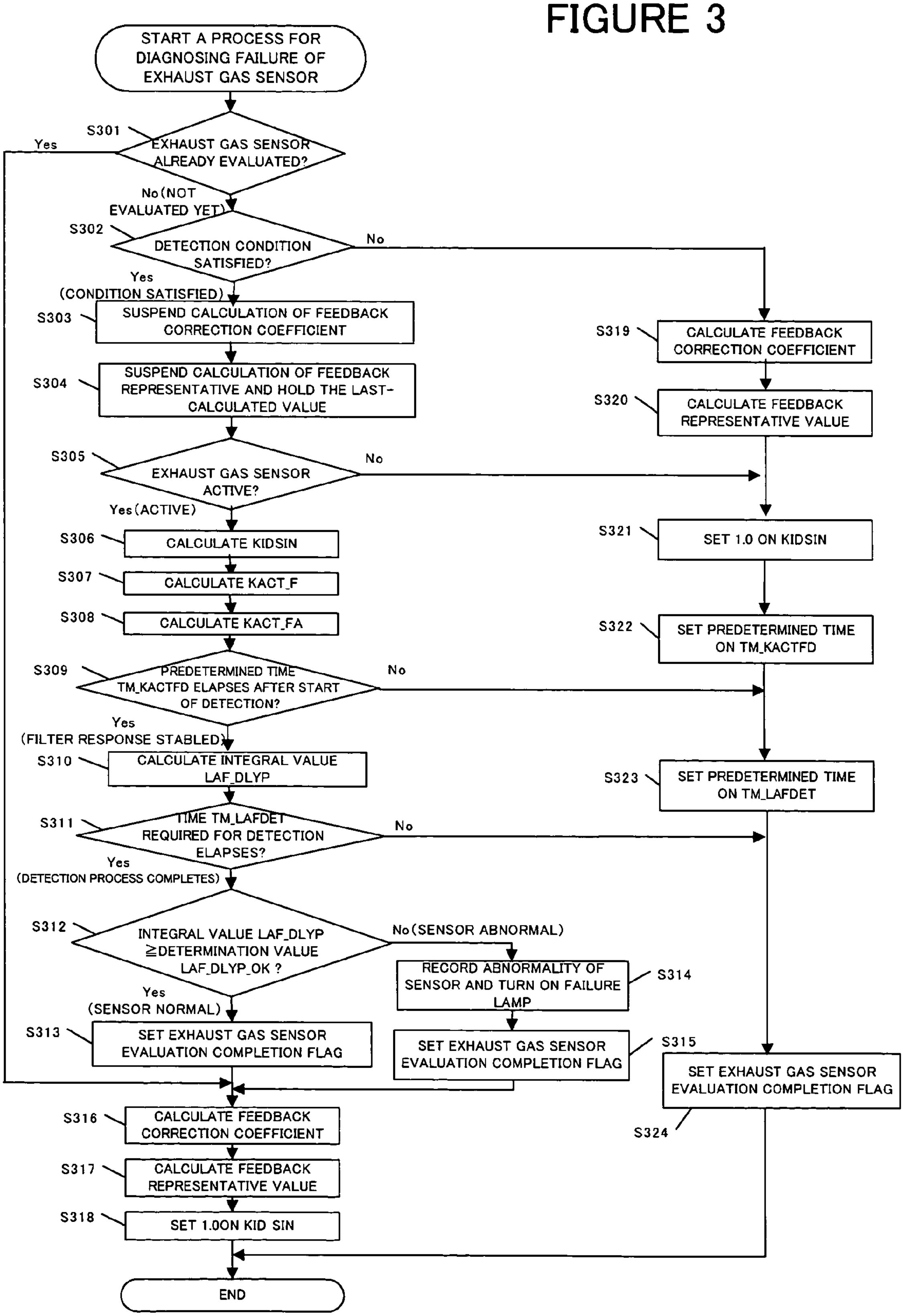
FIG. 3 shows a flowchart of one embodiment of the present invention.

As described above, these functions can be realized integratedly by the ECU shown in FIG. 2. FIG. 2 schematically shows an overall structure of an electronic control unit (ECU) 200. In this embodiment, the functions of a detecting signal generating unit 202, an exhaust gas sensor evaluating unit 203, a responsiveness evaluating unit 204 and a fuel amount calculating unit 206 are integrated into the ECU that controls the engine system although the ECU may be provided as a controller dedicated for diagnosing the failure of the exhaust gas sensor. The ECU 200 is essentially a computer and comprises a processor for performing various computations, a Random Access Memory (RAM) for providing storage areas for temporally storing various data and a working space for the computations by the processor, a Read-Only Memory (ROM) for pre-storing programs to be executed by the processor and various data required for the computations. The ROM may be a re-writable non-volatile memory for storing computation results by the processor and the data to be stored among the data obtained from each section of the vehicle. The non-volatile memory can be implemented in the form of a RAM with a backup capability to which certain voltage is always supplied even when the system is shut down.

An input interface 201 is an interface unit of the ECU 200 with each section of the engine system. The input interface 201 receives information, indicating operating conditions of the vehicle, which is transmitted from various sections of the engine system, performs a signal processing, converts analog information to digital signals and then delivers those signals to the exhaust gas sensor evaluating unit 203, the responsiveness evaluating unit 204 and the fuel amount calculating unit 206. Although the KACT value that is output from the LAF sensor 103, a vehicle speed V, an engine rotational speed Ne, an engine load W and a LAF sensor active signal are shown as inputs to the input interface 201 in FIG. 2, the inputs are not limited to those parameters. Other parameters may be input.

The detecting signal generating unit 202 has a function of generating a predetermined signal KIDSIN to be used for detection. The signal is generated by adding a trigonometric function wave FDSIN or the like to an offset value IDOFT based on a command from the exhaust gas sensor evaluating unit 203. This detecting signal KIDSIN will be described later in association with a process for diagnosing an exhaust gas sensor failure.

The exhaust gas sensor evaluating unit 203 performs a necessary calculation and determination of the condition for executing the process for diagnosing the exhaust gas sensor failure based on the data delivered from the input interface 201 (this process will be described later). In addition, the unit 203 controls the detecting signal generating unit 202, the responsiveness evaluating unit 204 and the fuel amount calculating unit 206.

In accordance with a command from the exhaust gas sensor evaluating unit 203, the responsiveness evaluating unit 204 performs a bandpass filtering upon an output KACT from the LAF sensor 103, converting the filtered value to an absolute value, and then integrates converted values over a predetermined time period. These functions will be described in detail later in association with a process for diagnosing an exhaust gas sensor failure.

The fuel amount calculating unit 206 has a function of receiving the detecting signal KIDSIN generated by the detecting signal generating unit 202, multiplying the detecting signal to the first basic fuel injection amount to produce the second basic fuel injection amount, further multiplying the feedback correction coefficient (or the feedback representative value) to the second basic fuel injection amount and then providing the resulting final fuel injection amount INJ to the output interface 205. The fuel amount calculating unit 206 includes a feedback compensation function for using the detection value from the exhaust gas sensor to calculate the above-described feedback correction coefficient in order to keep the air-fuel ratio close to a stoichiometric air-fuel ratio as well as a function of calculating a feedback representative value (will be described later).

The output interface 205 has a function of sending a control signal indicating the fuel injection amount INJ to one or more fuel injectors of the engine. Besides, the output interface 205 sends a control signal from the exhaust gas sensor evaluating unit 203 to a failure lamp. The functions of the output interface 205 are not limited to these ones. Other controller or the like may be connected to the output interface 205.

2. Description of a Process for Diagnosing an Exhaust Gas Sensor Failure

A process for an exhaust gas sensor failure diagnosis will now be described. A degradation failure of the LAF sensor 103, an exhaust gas sensor, is diagnosed.

When the exhaust gas sensor failure diagnosis process is invoked from a main program, the exhaust gas sensor evaluating unit 203 checks an exhaust gas sensor evaluation completion flag to determine whether or not a degradation failure of the exhaust gas sensor has been already evaluated (S301). Initially, since the evaluation upon the exhaust sensor is not performed yet, the exhaust gas sensor evaluation completion flag is set to 0, so the process proceeds to Step S302, in which it is determined whether or not a detection condition is satisfied. The detection condition means such state that the vehicle speed, the engine rotational speed and the engine load are within their respective predetermined ranges. Therefore, the exhaust gas sensor evaluating unit 203 obtains the vehicle speed V, the engine rotational speed Ne and the engine load W through the input interface 201 to determine whether or not all of these values are within the respective predetermined ranges. When this condition is not satisfied, the process proceeds to Step S319. In this case, since the degradation failure detection is not performed, the feedback correction coefficient at the normal operation time is calculated, and the feedback representative value is calculated in Step S320.

More specifically, calculation of the feedback correction coefficient KAF is performed based on the output from the LAF sensor. Based on the KACT, an output value from the LAF sensor, which is received through the input interface, the exhaust gas sensor evaluating unit 203 determines whether the final fuel injection amount to be injected by the injection function is lean or rich. The fuel amount calculating unit 206 reduces the previously calculated value of the feedback correction coefficient by a constant rate when it is rich, while the unit 206 increases that value by the constant rate when it is lean. Alternatively, in order to keep the air-fuel ratio around the stoichiometric air-fuel ratio, the correction coefficient may be changed in a form of discrete steps rather than using the constant rate when the signal changes from lean to rich or rich to lean.

The feedback representative value can be obtained by smoothing the feedback correction coefficients KAF according to the following equation. The calculation result is stored and held.

$$KAF\text{CENTER}=(1-c_1)\times KAF_{i-1}+c_1\times KAF_i$$

where $c_1$ is a smoothing coefficient.

Although the smoothing calculation is used in this example, a feedback representative value KAFCENTER can be alternatively obtained by using an average or the like of the multiple feedback correction coefficients.

For example, in case of using the average, the representative value KAFCENTER can be calculated according to the following equation:

$$KAFCENTER=\frac{KAF_i+KAF_{i-1}+\ldots+KAF_{i-j}}{i-j+1} \quad (1)$$

In a further alternative, a feedback representative value KAFCENTER can be obtained by using a median of the feedback correction coefficients. In this case, m median values $KAF_{M1}$, $KAF_{M2}$, . . . , $KAF_{Mm}$ are first derived for each of m groups of n feedback correction coefficients $KAF_1$, . . . , $KAF_n$ which are ordered in an ascending sequence within each group, and then the median value can be obtained by calculating an average as shown in the following equation:

$$KAFCENTER=\frac{KAF_{M1}+\ldots+KAF_{Mm}}{m} \quad (2)$$

Subsequently, the responsiveness evaluating unit 204 sends a command to the detecting signal generating unit 202 so as to request for the suspension of the detection signal because the deterioration failure detection is not performed at this time point. In response to such command, the detecting signal generating unit 202 sets IDOFT to a constant of 1.0 and FDSIN to a constant value of 0 and then generates a composite signal KIDSIN by adding the IDOFT and the FDSIN together (in this case, the composite signal KIDSIN becomes 1.0). The KIDSIN is a coefficient to be multiplied to a first basic fuel injection amount to produce a second basic fuel injection amount as shown in FIG. 1. When the KIDSIN is 1.0, the basic fuel injection amount to be used in a normal operation time is output, and then the feedback correction coefficient KAF is multiplied to this amount. Thus, the final fuel injection amount INJ is injected from the injection function. After sending the command to the detecting signal generating unit 202, the exhaust gas sensor evaluating unit 203 sets a predetermined time on a timer TM_KACTFD and starts a countdown of the timer TM_KACTFD (S322). The predetermined time to be set on the TM_KACTFD in this step is a time until a response to the fuel injection reflecting the detecting signal is output stably from the engine since the condition for the exhaust gas sensor evaluation has been satisfied (as will be described later) to perform the fuel injection reflecting the detecting signal. Thus, by setting the timer in order for an integral operation (which will be described later) to start when the predetermined time has elapsed, the response can be evaluated except for such unstable state that may happen just after the detection signal is reflected in the fuel injection amount, so that the detection accuracy can be improved.

After setting the TM_KACTFD on the timer, the exhaust gas sensor evaluating unit 203 sets a predetermined time on a timer TM_LAFDET and then starts a countdown of the timer TM_LAFDET. The predetermined time to be set on the timer TM_LAFDET is an integration time for performing an integral operation upon absolute values (which will be output in a later stage). The result of the integral operation is to be used to determine the deterioration failure of the exhaust sensor. After setting the timer TM_LAFDET (S323), the exhaust gas sensor evaluating unit 203 resets the exhaust gas sensor evaluation completion flag to 0 (S324) and then terminates this process. It should be noted that the calculation of the feedback correction coefficients in Step S319 and Step S316 (to be described later) means the calculation of the feedback correction coefficients in such normal feedback calculating operations including, for example, suspension of the feedback during a fuel-cut process, but it does not mean a continuation of the calculation of the feedback correction coefficients under all operating conditions.

When the exhaust gas sensor failure diagnosis process is invoked again by the main program, the process in Step S301 is performed but the exhaust gas sensor is still not evaluated yet at this time, so the process proceeds to Step S302, in which it is determined whether or not the detection condition is satisfied. When the detection condition is satisfied in Step S302, the exhaust gas sensor evaluating unit 203 proceeds the process to Step S303 in order to prepare for the deterioration detection. The sensor evaluating unit 203 sends a command to the fuel injection unit 206 to suspend the calculation of the feedback correction coefficients (S303) and also suspend the calculation of the feedback representative value and hold the feedback representative value calculated at that time point (S304).

Next, the exhaust gas sensor evaluating unit 203 receives a LAF sensor active signal through the input interface 201 and determines whether or not the LAF sensor 103 has already become active (S305). The LAF sensor 103 is not active sufficiently when only a short time elapses after the engine start. Therefore, when a predetermined time does not elapse after the start of the engine, the exhaust gas sensor evaluating unit 203 proceeds the process to S321. Although the calculations of the feedback correction coefficients and the feedback representative value are suspended before Step S305, the suspension of those calculations must be continued because the LAF sensor 103 is not active yet. The operations in Step S321 and the subsequent steps are same as described above.

After the above-described processes is completed, the exhaust gas sensor failure diagnosis process is invoked again by the main program. At this time, the exhaust gas sensor evaluation completion flag is being reset by the previous process and the exhaust gas sensor becomes active when the predetermined time after the engine start elapses, so the exhaust gas sensor evaluating unit 203 proceeds the process from Step S301 to Step S302 in order to perform Step S303 and Step S304 in the same manner as above described. Then, the process proceeds to Step S306 via Step S305.

When all of the above-described detection conditions are satisfied, the exhaust gas sensor evaluating unit 203 sends a request for calculating a KACT_FA to the detecting signal generating unit 202. Upon receiving the request for the calculation of KACT_FA, the detecting signal generating unit 202 first generates a sine wave IDSIN with a frequency fid (3 Hz is used in this example) and an amplitude aid (0.03 in this example) and then adds an offset amount (1.0 in this example) to the above-generated sine wave IDSIN so as to obtain a KIDSIN (namely, $1.0+0.03*\sin 6\pi t$) in Step S306. This value KIDSIN is continuously transmitted to the fuel amount calculating unit 206. Upon receiving the KIDSIN, the fuel amount calculating unit 206 multiplies the KIDSIN to the first basic fuel injection amount and further multiplies the stored feedback representative value KAFCENTER to the basic fuel amount to obtain a final fuel injection amount INJ. This final fuel injection amount INJ is input to the injection function of the engine 102 through the output interface 205. As the engine is operated in accordance with such final fuel injection amount INJ, the exhaust gas, which is an output corresponding to the final fuel injection amount as an input, is emitted from an exhaust system of the engine. Then, the LAF sensor 103 detects the emitted exhaust gas and inputs its output KACT to the responsiveness evaluating unit 204 through the input interface 201. The responsiveness evaluating unit 204 substitutes the KACT into the following equation in order to calculate a bandpass-filtered output KACT_F (S307).

$$KACT\_F(k)=a1\ KACT\_F(k-1)+a2\ KACT\_F(k-2)+a3\ KACT\_F(k-3)+b0\ KACT(k)+b1\ KACT(k-1)+b2\ KACT(k-2)+b3\ KACT(k-3) \quad (3)$$

where a1, a2, a3, b0, b1, b2 and b3 are filtering coefficients.

Figure 4:
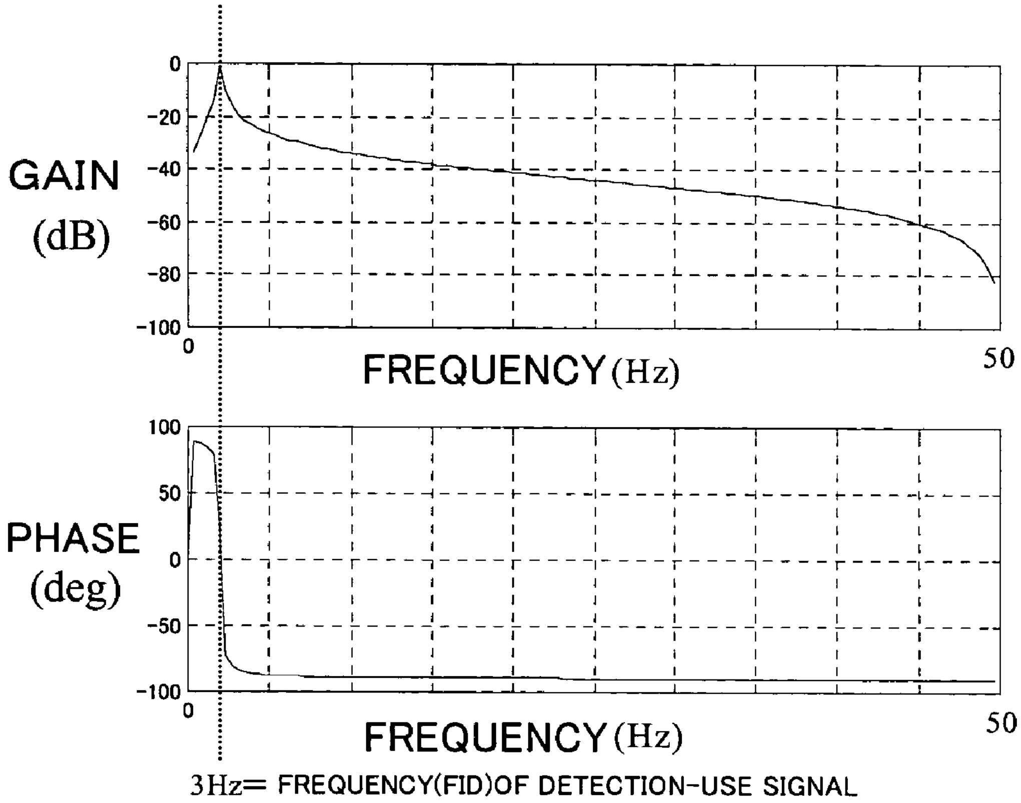
FIG. 4 schematically shows an example of a frequency characteristic of a bandpass filter used in the present invention.

The frequency property of the bandpass filter used here is to pass the frequency of 3 Hz that is the same as the frequency of the detecting signal as shown in FIG. 4.

Figure 5:
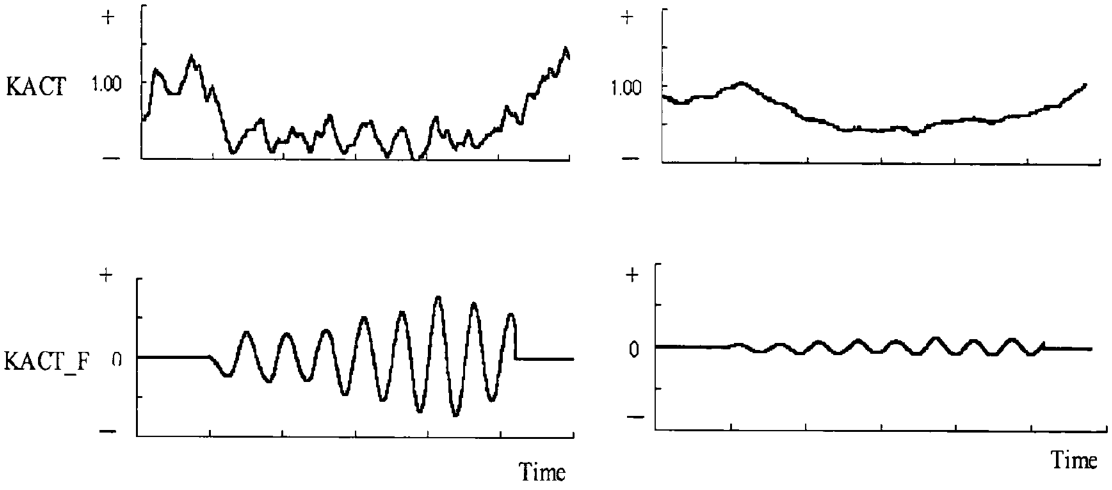
FIG. 5 schematically shows an example of extraction of a detecting frequency fid.

After having calculated the KACT_F value (as shown in FIG. 5), the responsiveness evaluating unit 204 calculates an absolute value KAT_FA from the KACT_F (S308).

Figure 6:
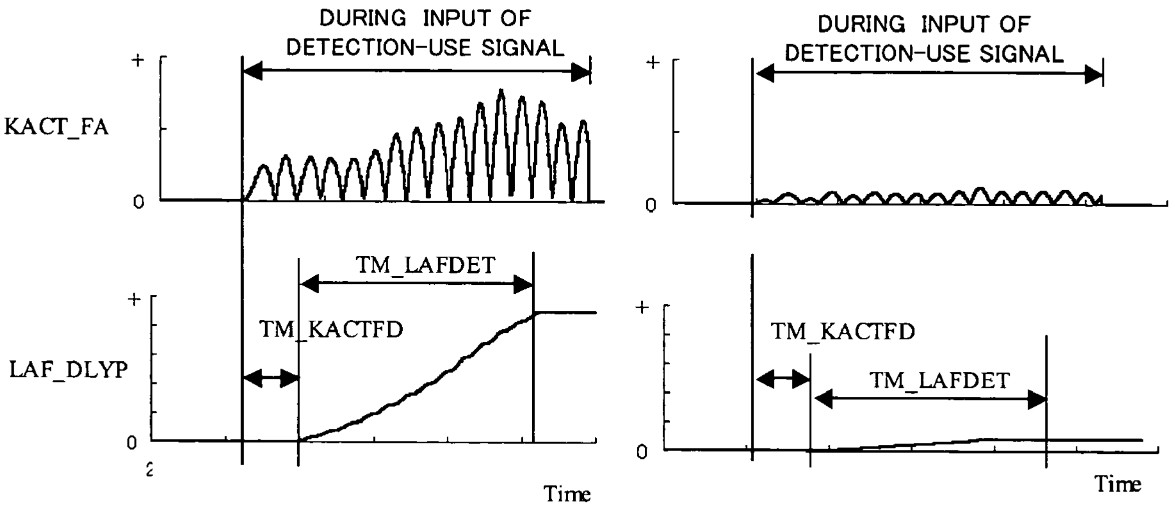
FIG. 6 schematically shows an example of calculation of a LAF sensor responsiveness parameter LAF_DLYP.

Upon completion of the calculation of the KACT_FA in the responsiveness evaluating unit 204, the exhaust gas sensor evaluating unit 203 determines whether or not the timer TM_KACTFD is 0 (S309). When the timer TM_KACTFD is not 0, the exhaust gas sensor evaluating unit 203 proceeds the process to Step S323. Operations in Step S323 and the subsequent steps are the same as described above. On the other hand, when the timer TM_KACTED is 0, the exhaust gas sensor evaluating unit 203 informs the responsiveness evaluating unit 204 that the timer condition is satisfied. Upon such information, the responsiveness evaluating unit 204 calculates the integral value LAF_DLYP successively (S310). Thus, the detection precision can be improved by deferring the start time for calculating the integral value until the timer TM_KACTED becomes 0 and the input of the signal for the detection becomes stable to be reflected on the equivalence ratio KACT. FIG. 6 shows an example of calculation of LAF_DLYP relative to the continuous time in a horizontal axis.

Upon completion of the calculation of LAF_DLYP in the responsiveness evaluating unit 204, the exhaust gas sensor evaluating unit 203 determines whether or not the timer TM_LAFDET is 0. When the timer TM_LAFDET is not 0, the process proceeds to Step S324. Operations in Step S324 and the subsequent steps are same as above described. On the other hand, when the timer TM_LAFDET is 0, the exhaust gas sensor evaluating unit 203 request the responsiveness evaluating unit 204 to suspend the integral calculation of for the value KACT_FA over the predetermined time period, receiving the current value of the calculated integral values LAF_DLYP transmitted from the responsiveness evaluating unit 204 and proceeds the process to Step S312. In Step S312, the exhaust gas sensor evaluating unit 203 determines whether or not the integral value LAF_DLYP exceeds a predetermined value LAF_DLYP_OK. The LAF_DLYP_OK value is a threshold value for determining, based on the integral value LAF_DLYP, whether or not the exhaust gas sensor fails due to deterioration.

When the integral value LAF_DLYP exceeds the determination value LAF_DLYP_OK, the exhaust gas sensor evaluating unit 203 determines that the exhaust gas sensor is not in a failure by deterioration, sets the exhaust gas sensor evaluation completion flag to 1 (S313) and sends a command to the fuel amount calculating unit 206 to perform the feedback correction coefficient calculation (S316) and the feedback representative value calculation (S317). Then, the exhaust gas sensor evaluating unit 203 sends a request command to the detecting signal generating unit 202 to set the KIDSIN to 1.0 (S318). After the generation of the detecting signal is suspended, this process is terminated.

On the other hand, when the integral value LAF_DLYP does not exceed the determination value LAF_DLYP_OK, the exhaust gas sensor evaluating unit 203 determines that the exhaust gas sensor has failed by deterioration, stores information indicating abnormality of the exhaust gas sensor and turns on an exhaust gas failure lamp through the output interface 205 (S314). Then, the unit 203 sets the exhaust gas sensor evaluation completion flag to 1 (S315) and proceeds the process to Step S316. Operations in Step S316 and the subsequent steps are same as above described.

Figure 7:
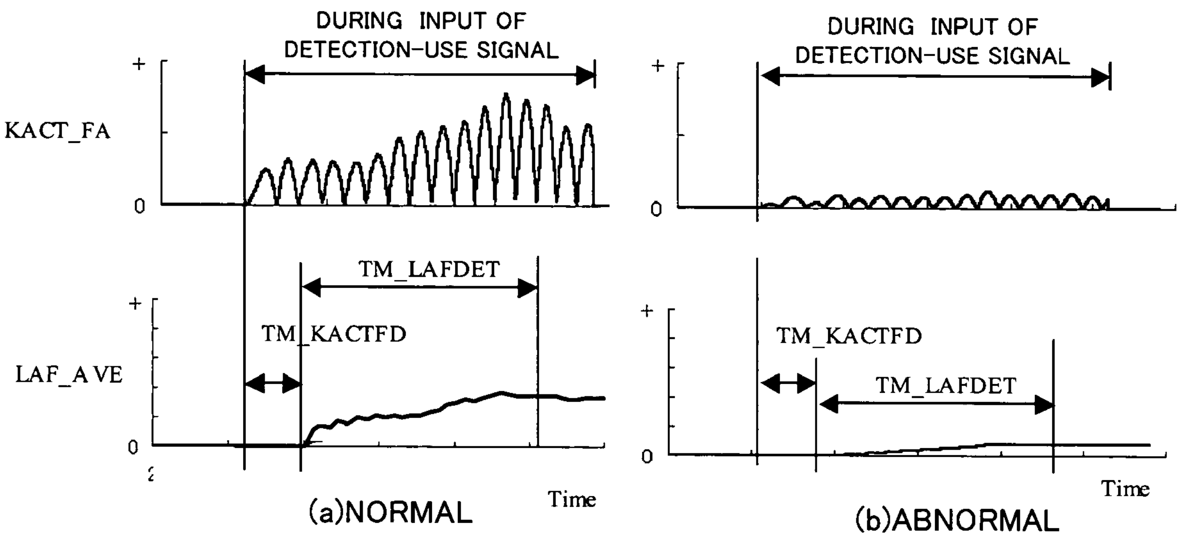
FIG. 7 schematically shows an example of calculation of a LAF sensor responsiveness parameter LAF_AVE.

As an alternative method for determining the degradation failure, in Step S310, rather than determining the degradation failure of the exhaust gas sensor based on the integral value LAF_DLYP, such smoothing calculation is performed as shown in FIG. 7 in which a moving average for the KACT_FA values is calculated, and then the deterioration failure of the exhaust gas sensor may be determined based on such smoothed value LAF_AVE. Following is an example of an equation for calculating a smoothed value LAF_AVE.:

$$LAF\_AVE=(1-c_2)\times KACT\_FA_{i-1}+c_2\times KACT\_FA_i \qquad (4)$$

where $c_2$ represents a smoothing coefficient.

In this case, in Step S312, the exhaust gas sensor evaluating unit 203 determines whether or not the smoothed value LAF_AVE exceeds a determination value LAF_AVE_OK. When the smoothed value LAF_AVE does not exceed the determination value LAF_DLYP_OK, the exhaust gas sensor evaluating unit 203 determines that the exhaust gas sensor is in a failure due to deterioration. On the other hand, when the value LAF_AVE exceeds the determination value LAF_DLYP_OK, the exhaust gas sensor evaluating unit 203 determines that the exhaust gas sensor is not in a failure due to deterioration.

According to the present invention, the engine is given the fuel injection amount that is multiplied by such detecting signal as a sine wave variation to be used for evaluating the exhaust gas sensor, and then the responsiveness of the exhaust gas sensor is evaluated based on the subsequent outputs from the exhaust gas sensor. Thus, since such composite output that corresponds to the exhaust gas oxygen level is not used, it is possible to obtain an exhaust gas sensor output that contains necessarily more than a certain constant rate of frequency components, and it is also possible to improve the determination precision when the condition of the exhaust gas sensor is determined by using the frequency response characteristic.

Even if the feedback operation is suspended in order to perform the degradation failure detection, the fuel amount is controlled by using the feedback representative value based on the feedback correction coefficient. Accordingly, the increase of the exhaust gas components during the deterioration failure detection can be suppressed while keeping a higher detection precision as described above.

Besides, noise elements can be eliminated at the time of the sensor measurement by using the bandpass-filtered outputs so as to remove frequency components except for the frequency to be used for the detection. Accordingly, it is possible to eliminate the influence of the other frequency components caused by the air-fuel ratio variation or the like that may occur in particular at the time of the transient operation. As a result, the detection precision can be improved.

Because the deterioration failure of the exhaust gas sensor is determined based on the smoothing value including the average value or the integral value over the predetermined time period for the absolute values of the bandpass-filtered output waves, the influence of an eruptive spike of air-fuel ratio or the like caused by the engine load variation or the like can be removed from the evaluation for the detection of the exhaust gas sensor deterioration, so that the precision of the deterioration failure determination can be further improved.

3. Use of a Composite Wave

The sine wave is used as a detecting signal in the above-described embodiment. The same effect can be obtained by using either a trigonometric function wave of a single frequency or a trigonometric wave, or a composite wave including a plurality of these waves. In either case, when the detecting signal has a limitation in the amplitude, the spectrum components of the desired single frequency or the multiple frequencies can be expanded, so that the precision for detecting the noise can be enhanced.

Figure 8:
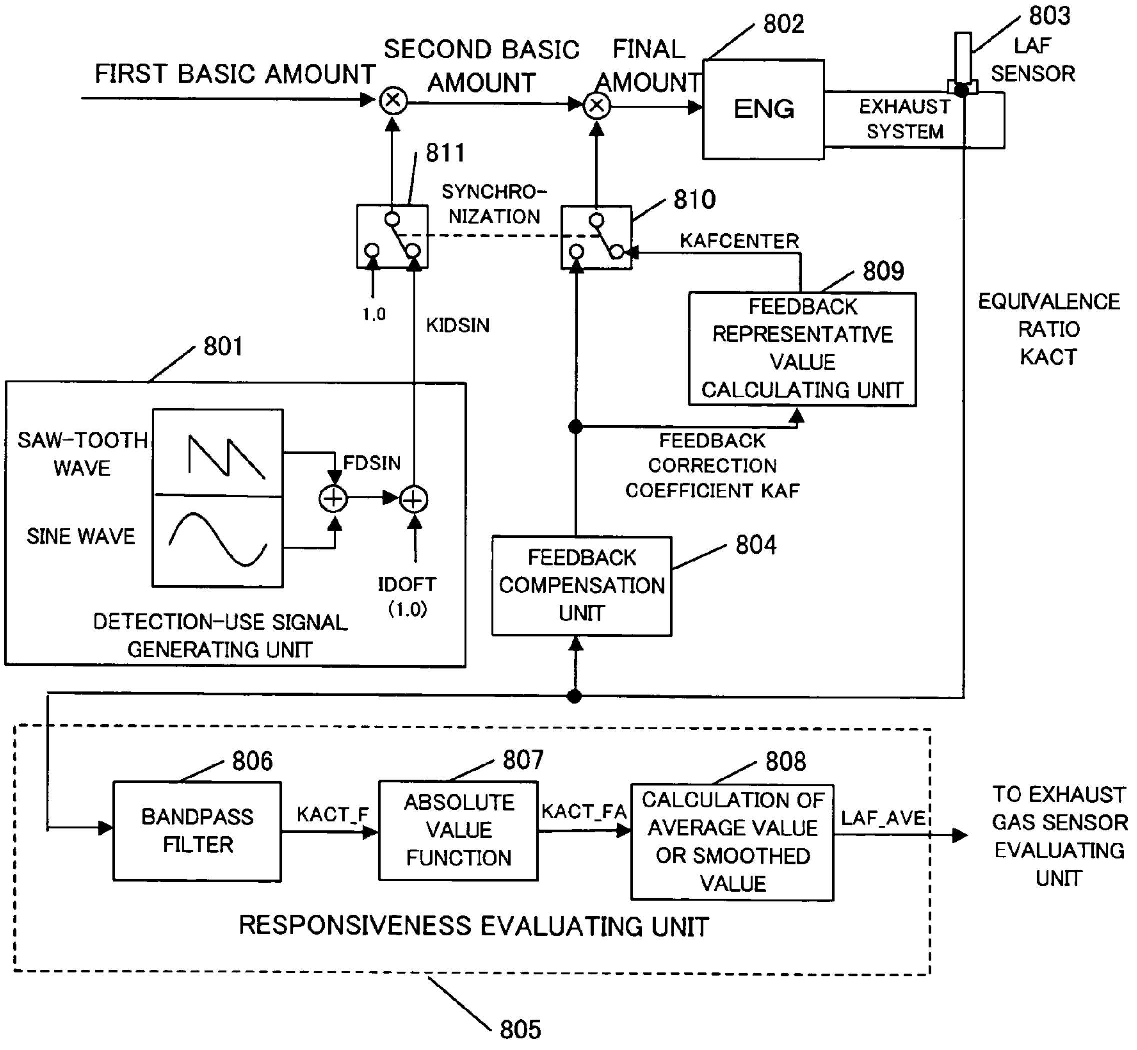
FIG. 8 is a schematic diagram showing an exhaust gas sensor failure diagnostic apparatus when a composite wave is used.

For example, there exists a fuel deposit delay in an air intake system of the engine. In particular, this delay becomes significant, for example, at a lower temperature time, or as for the gasoline sold in the North America area, because such gasoline contains heavy elements relatively more in the volatile constituent elements. Although there is a technique for correcting such fuel deposit delay, a complete correction cannot be easily obtained. For example, with control parameters that are set for the normal gasoline, the correction becomes insufficient in case where those parameters are applied to the gasoline containing heavy elements relatively more. In such a case, there occurs such phenomenon as an unfavorable rise in the wave of the actual air-fuel ratio relative to the wave of the command value of the air-fuel ratio. In such a case, if the technique of the present invention is applied, the amplitude of the actual air-fuel ratio may become smaller than presumed, and accordingly the detection precision may deteriorate. Therefore, the trigonometric function wave is provided in order to obtain a wave that is capable to mitigate the decrease of the amplitude of the real air-fuel ratio caused by the fuel deposit. FIG. 8 shows one embodiment using a composite wave formed by a basic sine wave and a saw-tooth wave.

Figure 9:
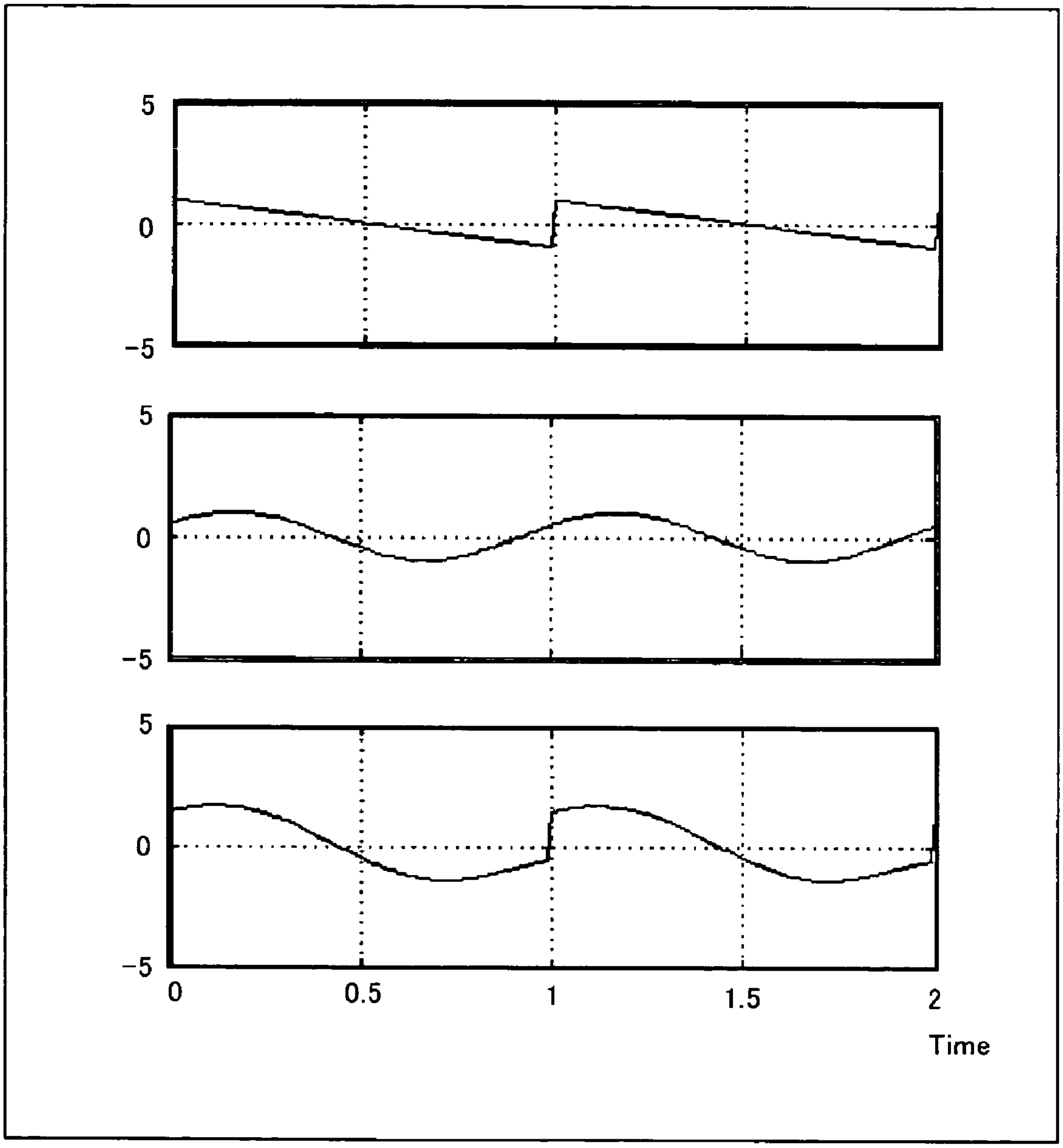
FIG. 9 shows examples of input composite waves.

As can be seen from the waves in FIG. 9, a composite wave is formed to be in phase with the amplitude of the saw-tooth wave that increases stepwise in accordance with the timing for changing the fuel amount toward an increasing direction. By using this composite wave, it is possible to correct an amount of the fuel deposit when the fuel amount increases. In such way, because the decrease of the actual air-fuel ratio can be reduced, the decrease of the precision in the deterioration detection for the exhaust gas sensor can be prevented. In this embodiment, the composite wave formed by a sine wave and a saw-tooth wave is used. However, if a desired waveform can be obtained by any composite wave that may be formed by combining any trigonometric function waves such as a dynamic correction waveform that is matched with the deposit characteristic of the engine, it may be more efficient.

Figure 10:
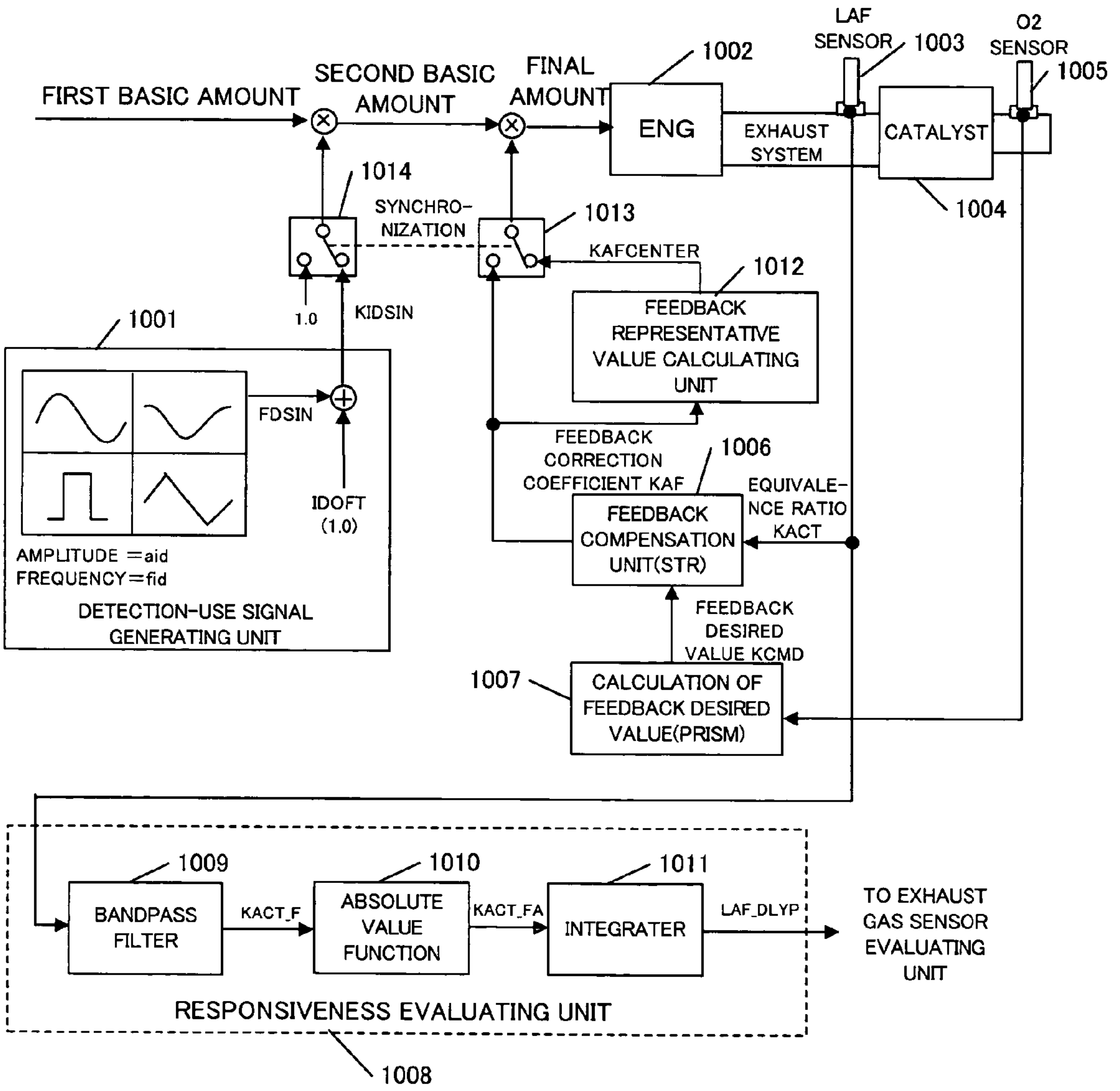
FIG. 10 is a schematic diagram showing an exhaust gas sensor failure diagnostic apparatus using a feedback of both outputs of before-catalyst and after-catalyst exhaust gas sensors.

4. Case of Using the Output Feedback of Before- and After-catalyst Exhaust Gas Sensors The above-described detection scheme according to the present invention can be applied to a system having a feedback system (FIG. 10) using both outputs of a before-catalyst exhaust gas sensor and an after-catalyst exhaust gas sensor. According to this invention, because the final fuel injection amount is corrected in accordance with the feedback correction coefficient that is established based on both outputs of the exhaust gas sensors disposed upstream and downstream of a catalytic converter, it is possible to further improve a feedback controllability that is requested by the catalytic converter during a normal control mode. The precision of the feedback representative value can be accordingly improved because the representative value is calculated by using those feedback correction coefficients. Thus, since a drift to either lean or rich during the detection can be suppressed with a high precision, it is possible to suppress the decrease of the catalyst purification rate that occurs in the degradation failure diagnostic process for the exhaust gas sensor and prevent the increase of the exhaust amount of the harmful constituents contained in the exhaust gas while keeping the detection precision at a high level.

What is claimed is:

1. A deterioration failure diagnostic apparatus for an exhaust gas sensor disposed in an exhaust passage of an internal-combustion engine, said sensor producing outputs responsive to exhaust gas from the engine, comprising:

detecting signal generating means for generating a detecting signal and multiplying the generated signal to a first basic fuel injection amount to produce a second basic fuel injection amount;

feedback representative value calculating means for calculating a feedback representative value based on a feedback correction coefficient used at a normal operation time and multiplying the feedback representative value to the second fuel injection amount to produce a final fuel injection amount to be injected to the engine; and exhaust gas sensor evaluating means for extracting from an output of the exhaust gas sensor of the engine a frequency response corresponding to the detecting signal, the output being in response to the final fuel injection amount, said exhaust gas sensor evaluating means determining a condition of the exhaust gas sensor based on the extracted frequency response.

2. The deterioration failure diagnostic apparatus of claim 1, wherein the feedback representative value is a value representing a steady-state deviation of the feedback correction coefficients being used before starting a degradation failure detection for the exhaust gas sensor.

3. The deterioration failure diagnostic apparatus of claim 1, wherein the detecting signal to be multiplied to the first basic fuel injection amount comprises a signal obtained by adding either a sine wave or a cosine wave or a trigonometric wave to a predetermined offset value.

4. The deterioration failure diagnostic apparatus of claim 1, wherein the detecting signal to be multiplied to the first basic fuel injection amount comprises a signal obtained by adding a composite wave formed by two or more trigonometric function waves to a predetermined offset value.

5. The deterioration failure diagnostic apparatus of claim 1, wherein the exhaust gas sensor evaluating means determines the condition of the exhaust gas sensor when a predetermined time has elapsed since the final fuel injection amount was supplied to the engine.

6. The deterioration failure diagnostic apparatus of claim 1, wherein the exhaust gas sensor evaluating means determines the condition of the exhaust gas sensor by using an output from the exhaust gas sensor after having applied a bandpass filtering on the output.

7. The deterioration failure diagnostic apparatus of claim 6, wherein the exhaust gas sensor evaluating means determines that the exhaust gas sensor is in a failure when an integral value obtained by integrating absolute values of the bandpass-filtered outputs from the exhaust gas sensor is less than a predetermined value.

8. The deterioration failure diagnostic apparatus of claim 6, wherein the exhaust gas sensor evaluating means determines that the exhaust gas sensor is in a failure when a value obtained by a calculation of smoothing absolute values of the bandpass-filtered outputs from the exhaust gas sensor is less than a predetermined value.

9. The deterioration failure diagnostic apparatus of claim 1, wherein the feedback coefficient is determined based on an output of either an exhaust gas sensor disposed upstream of a catalytic converter or an exhaust gas sensor disposed downstream of the catalytic converter, or based on outputs from both of the exhaust gas sensors disposed upstream and downstream of the catalytic converter.

10. A deterioration failure diagnostic method for an exhaust gas sensor disposed in an exhaust passage of an internal-combustion engine, said sensor producing an output responsive to exhaust gas from the engine, including:

calculating a feedback representative value based on a feedback correction coefficient used at a normal operation time;

generating a detecting signal and multiplying the generated signal to a first basic fuel injection amount used at a normal operation time to produce a second fuel injection amount;

multiplying the feedback representative value to the second fuel injection amount to produce a final fuel injection amount;

extracting a frequency response corresponding to the detecting signal from an output of the exhaust gas sensor of the engine, the output being in response to the final fuel injection amount; and determining a condition of the exhaust gas sensor based on the extracted frequency response.

11. Computer usable medium having encoded therein a computer program which causes an electronic control unit of an automobile to execute the functions of diagnosing failure of an exhaust gas sensor disposed in an exhaust passage of the engine, said sensor producing an output responsive to exhaust gas from the engine, including:

calculating a feedback representative value based on a feedback correction coefficient used at a normal operation time;

generating a detecting signal and multiplying the generated signal to a first basic fuel injection amount used at a normal operation time to produce a second fuel injection amount;

multiplying the feedback representative value to the second fuel injection amount to produce a final fuel injection amount;

extracting a frequency response corresponding to the detecting signal from an output of the exhaust gas sensor of the engine, the output being in response to the calculated final fuel injection amount; and determining a condition of the exhaust gas sensor based on the extracted frequency response.

* * * * *